(12) United States Patent
Abedini et al.

(10) Patent No.: US 11,285,476 B2
(45) Date of Patent: Mar. 29, 2022

(54) MICROFLUIDIC DEVICES AND SYSTEMS, AND METHODS FOR OPERATING MICROFLUIDIC DEVICES AND SYSTEMS

(71) Applicant: INTERFACE FLUIDICS LTD., Calgary (CA)

(72) Inventors: Ali Abedini, Edmonton (CA); Adam Pettigrew, Edmonton (CA); Bo Bao, Shanghai (CN); Thomas De Haas, Edmonton (CA); Stuart Kinnear, Calgary (CA); Scott Pierobon, Edmonton (CA)

(73) Assignee: INTERFACE FLUIDICS LTD., Calgary (CA)

( * ) Notice: Subject to any disclaimer, the term of this patent is extended or adjusted under 35 U.S.C. 154(b) by 215 days.

(21) Appl. No.: 16/554,804

(22) Filed: Aug. 29, 2019

(65) Prior Publication Data

US 2020/0215541 A1 Jul. 9, 2020

Related U.S. Application Data

(60) Provisional application No. 62/789,553, filed on Jan. 8, 2019.

(51) Int. Cl.
*G01N 15/08* (2006.01)
*B01L 3/00* (2006.01)

(52) U.S. Cl.
CPC .... *B01L 3/502715* (2013.01); *G01N 15/0806* (2013.01); *G01N 15/0826* (2013.01); *B01L 2300/08* (2013.01); *B01L 2300/0861* (2013.01); *B01L 2400/0475* (2013.01)

(58) Field of Classification Search
CPC .. B01L 3/502715; B01L 3/5027; B01L 3/502; B01L 3/50; G01N 15/0806; G01N 15/0826
USPC ........................................................ 436/180
See application file for complete search history.

(56) References Cited

U.S. PATENT DOCUMENTS

| | | | |
|---|---|---|---|
| 6,900,021 B1 * | 5/2005 | Harrison | ............ B01J 19/0093 422/504 |
| 8,340,913 B2 | 12/2012 | Mostowfi et al. | |
| 8,380,446 B2 | 2/2013 | Mostowfi et al. | |
| 8,709,152 B2 | 4/2014 | Hansen et al. | |
| 9,488,586 B2 | 11/2016 | He et al. | |
| 9,689,858 B2 | 6/2017 | Ratulowski et al. | |
| 10,317,557 B2 | 6/2019 | Gonzalez et al. | |
| 10,895,544 B2 | 1/2021 | Molla et al. | |
| 11,015,434 B2 | 5/2021 | Molla et al. | |

(Continued)

*Primary Examiner* — Christine T Mui
(74) *Attorney, Agent, or Firm* — ABM Intellectual Property Inc.; Adrienne Bieber McNeil

(57) ABSTRACT

A microfluidic device includes a substrate having a first fluid inlet/outlet system, a second fluid inlet/outlet system, and a fluidic network between the first fluid inlet/outlet system and the second fluid inlet/outlet system and in fluid communication with the first fluid inlet/outlet system and the second fluid inlet/outlet system. The fluidic network includes a microfluidic channel network that is in fluid communication with the first fluid inlet/outlet system and spaced from the second fluid inlet/outlet system, a nanofluidic channel network fluidly connecting the microfluidic channel network and the second fluid inlet/outlet system, and a plurality of pores in fluid communication with the microfluidic channel network and the nanofluidic channel network.

13 Claims, 6 Drawing Sheets

(56) References Cited

U.S. PATENT DOCUMENTS

| | | |
|---|---|---|
| 2010/0017135 A1 | 1/2010 | Mostowfi |
| 2013/0100453 A1 | 4/2013 | Harrison et al. |
| 2013/0330245 A1* | 12/2013 | Duncan ............. B01L 3/502715 |
| | | 422/502 |
| 2015/0096385 A1 | 4/2015 | Downie et al. |
| 2019/0011423 A1 | 1/2019 | Molla et al. |
| 2020/0290040 A1 | 9/2020 | Molla et al. |

* cited by examiner

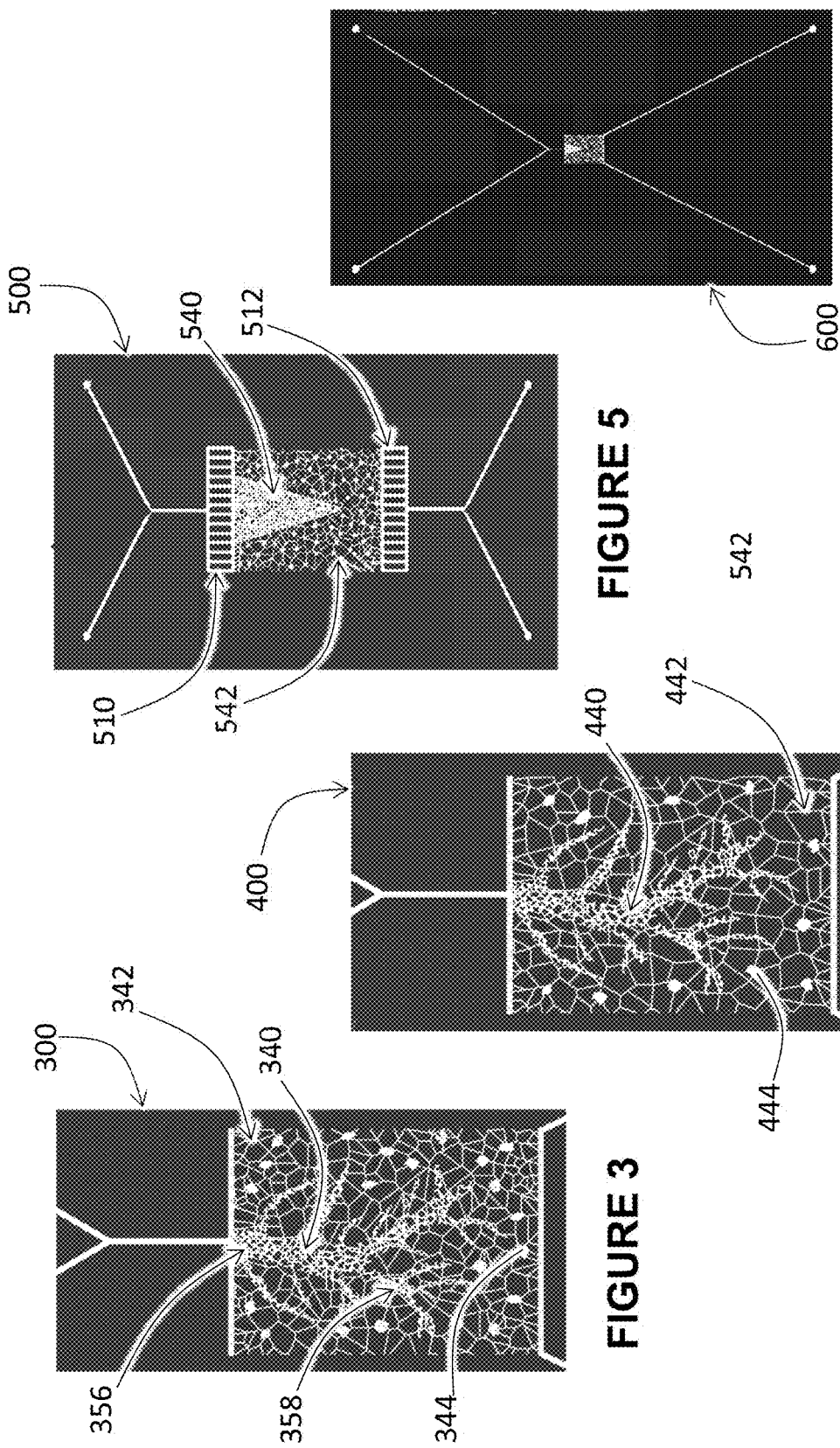

MICROFLUIDIC DEVICES AND SYSTEMS, AND METHODS FOR OPERATING MICROFLUIDIC DEVICES AND SYSTEMS

CROSS REFERENCES TO RELATED APPLICATIONS

This application claims the benefit of and/or priority from U.S. Provisional Patent Application No. 62/789,553, filed on Jan. 8, 2019, which is incorporated herein by reference in its entirety.

FIELD

This document relates to microfluidics. More specifically, this document relates to microfluidic devices such as microfluidic chips, systems including microfluidic devices, and methods for operating microfluidic devices and systems.

BACKGROUND

U.S. Pat. No. 9,488,586 (He et al.) discloses a mini-reservoir device that may be used to screen or otherwise determine a composition of one or more treatment fluids, additives, and other fluids. Such fluids may be for use in a subterranean formation. Methods of determining a composition may include visual analysis of each of two or more fluids, each from a plurality of candidate fluids, flowed through a mini-reservoir device, and selection of one of the plurality of candidate fluids based at least in part upon that visual analysis. Certain methods may include determining an oil recovery factor for each of one or more fluids flowed through a mini-reservoir device. In particular methods, multiple treatment fluids and/or additives, such as surfactants, may be selected based at least in part upon visual analysis of the fluids' flow through a mini-reservoir device.

SUMMARY

The following summary is intended to introduce the reader to various aspects of the detailed description, but not to define or delimit any invention.

A microfluidic device is disclosed. According to some aspects, the microfluidic device includes a substrate having a first fluid inlet/outlet system, a second fluid inlet/outlet system, and a fluidic network between the first fluid inlet/outlet system and the second fluid inlet/outlet system and in fluid communication with the first fluid inlet/outlet system and the second fluid inlet/outlet system. The fluidic network includes a microfluidic channel network that is in fluid communication with the first fluid inlet/outlet system and spaced from the second fluid inlet/outlet system, a nanofluidic channel network fluidly connecting the microfluidic channel network and the second fluid inlet/outlet system, and a plurality of pores in fluid communication with the microfluidic channel network and the nanofluidic channel network.

In some examples, the microfluidic channel network has a first set of microfluidic inlet/outlets that are fluidly connected to the first fluid inlet/outlet system, and a second set of microfluidic inlet/outlets that are fluidly connected to the nanofluidic channel network. In some examples, the nanofluidic channel network has a first set of nanofluidic inlet/outlets that are fluidly connected to the microfluidic channel network, a second set of nanofluidic inlet/outlets that are fluidly connected to the first fluid inlet/outlet system, and a third set of nanofluidic inlet/outlets that are fluidly connected to the second fluid inlet/outlet system.

In some examples, the microfluidic channel network has a depth of between about 1 micron and about 500 microns. In some examples, the microfluidic channel network has a depth of between about 20 microns and about 150 microns.

In some examples, the nanofluidic channel network has a depth of between about 1 nm and about 999 nm. In some examples, the nanofluidic channel network has a depth of between about 50 nm and about 500 nm.

In some examples, the microfluidic channel network is triangle shaped and has a base adjacent the first fluid inlet/outlet system and a peak spaced from the first fluid inlet/outlet system. In some examples, the microfluidic channel network is arborescent and has a stem adjacent the first fluid inlet/outlet system and a plurality of branches spaced from the first fluid inlet/outlet system.

In some examples, the first fluid inlet/outlet system includes at least a first inlet/outlet port and at least a first inlet/outlet channel fluidly connecting the first inlet/outlet port and the fluidic network, and the second fluid inlet/outlet system comprises at least a second inlet/outlet port and at least a second inlet/outlet channel fluidly connecting the second inlet/outlet port and the fluidic network.

In some examples, the substrate includes i) a base panel in which the first fluid inlet/outlet system, the second fluid inlet/outlet system, and the fluidic network are etched, and ii) a cover panel secured to the base panel and covering the first fluid inlet/outlet system, the second fluid inlet/outlet system, and the fluidic network. At least one of the base panel and the cover panel is transparent.

A method for operating a microfluidic device is also disclosed. According to some aspects, the method includes a. flowing at least a first volume of fluid into a microfluidic channel network of the microfluidic device; b. flowing the first volume of fluid from the microfluidic channel network into a nanofluidic channel network of the microfluidic device; and c. conducting an optical investigation of the first volume of fluid as the first volume of fluid flows through the microfluidic channel network and/or the nanofluidic channel network.

In some examples, the method further includes, after step b.: d. flowing a second volume of fluid into the microfluidic channel network of the microfluidic device; e. flowing the second volume of fluid from the microfluidic channel network into the nanofluidic channel network; and f. conducting an optical investigation of the second volume of fluid as the second volume of fluid flows through the microfluidic channel network and/or the nanofluidic channel network.

In some examples, the method further includes, after step e.: g. flowing a third volume of fluid into the microfluidic channel network of the microfluidic device; h. flowing the third volume of fluid from the microfluidic channel network into the nanofluidic channel network; and i. conducting an optical investigation of the third volume of fluid as the third volume of fluid flows through the microfluidic channel network and/or the nanofluidic channel network.

In some examples, the method further includes, after step h.: j. reversing the flow of fluid by flowing a fourth volume of fluid into the nanofluidic channel network, and flowing the fourth volume of fluid from the nanofluidic channel network into the microfluidic channel network; and k. conducting an optical investigation of the fourth volume of fluid as the fourth volume of fluid flows through the nanofluidic channel network and/or the microfluidic channel network.

In some examples, the method further includes allowing at least one of the first volume of fluid, second volume of fluid, and third volume of fluid to soak in the microfluidic device for a period of at least 10 minutes.

In some examples, the first volume of fluid includes salt water, the second volume of fluid includes oil, the third volume of fluid includes a test fluid, and the fourth volume of fluid includes oil.

In some examples, the method further includes, after step b.: reversing the flow of fluid by flowing a subsequent fluid into the nanofluidic channel network and from the nanofluidic channel network back into the microfluidic channel network; and conducting an optical investigation of the subsequent fluid as the subsequent fluid flows through the nanofluidic channel network and/or the microfluidic channel network.

A microfluidic system is also disclosed. According to some aspects, the microfluidic system includes a microfluidic device having a substrate with at least a first fluid inlet/outlet system, at least a second fluid inlet/outlet system, and a fluidic network between the first fluid inlet/outlet system and the second fluid inlet/outlet system and in fluid communication with the first fluid inlet/outlet system and the second fluid inlet/outlet system. A fluid injection system is connected to the first fluid inlet/outlet system for forcing fluid in a forward direction through the microfluidic device from the first fluid inlet/outlet system to the second fluid inlet outlet system via the fluidic network, and connected to the second fluid inlet/outlet system for forcing fluid in a reverse direction through the microfluidic device from the second fluid inlet/outlet system to the first fluid inlet outlet system via the fluidic network. An optical investigation system is provided for conducting an optical investigation of the fluidic network (either in whole or in part).

In some examples, the fluidic network includes a microfluidic channel network that is in fluid communication with the first fluid inlet/outlet system and spaced from the second fluid inlet/outlet system, a nanofluidic channel network fluidly connecting the microfluidic channel network and the second fluid inlet/outlet system, and a plurality of pores in fluid communication with the microfluidic channel network and the nanofluidic channel network.

In some examples, the system further includes a first fluid collection system connected to the first fluid inlet/outlet system for collecting fluid from the first fluid inlet/outlet system when the fluid is forced in the reverse direction. In some examples, the system further includes a second fluid collection system connected to the second fluid inlet/outlet system for collecting fluid from the second fluid inlet/outlet system when the fluid is forced in the forward direction.

Another method for operating a microfluidic device is also disclosed. According to some aspects, the method includes a. flowing a least a first volume of fluid through a microfluidic device in a forward direction from a first fluid inlet/outlet system, through a fluidic network, and towards a second fluid inlet/outlet system; b. reversing the flow of fluid by flowing a subsequent volume of fluid in a reverse direction from second fluid inlet/outlet system, through the fluidic network, and towards the first fluid inlet/outlet system; and c. conducting an optical investigation of at least a portion of the fluidic network during step a. and/or step b.

In some examples, the method further includes, between steps a. and b.: i. flowing a second volume of fluid through the microfluidic device in the forward direction; and ii. conducting an optical investigation of at least a portion of the fluidic network during step i.

In some examples, the method further includes, after step i.: iii. flowing a third volume of fluid through the microfluidic device in the forward direction; and iv. conducting an optical investigation of at least a portion of the fluidic network during step iii.

In some examples, the method further includes, between steps a. and b., allowing at least one of the first volume of fluid, the second volume of fluid, and the third volume of fluid to soak in the fluidic network for a period of at least 10 minutes.

In some examples, the first volume of fluid includes salt water, the second volume of fluid comprises oil, the third volume of fluid comprises a test fluid, and/or the fourth volume of fluid comprises oil.

In some examples, step a. includes: flowing the first volume of fluid into a microfluidic channel network of the fluidic network, and then flowing the first volume of fluid from the microfluidic channel network into a nanofluidic channel network of the fluidic network.

In some examples, step b. includes flowing the subsequent fluid from the nanofluidic channel network back into the microfluidic channel network.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 3 is a top view of another example microfluidic device;

FIG. 4 is a top view of another example microfluidic device;

FIG. 5 is a top view of another example microfluidic device;

FIG. 6 is a top view of another example microfluidic device;

DETAILED DESCRIPTION

Figure 1:
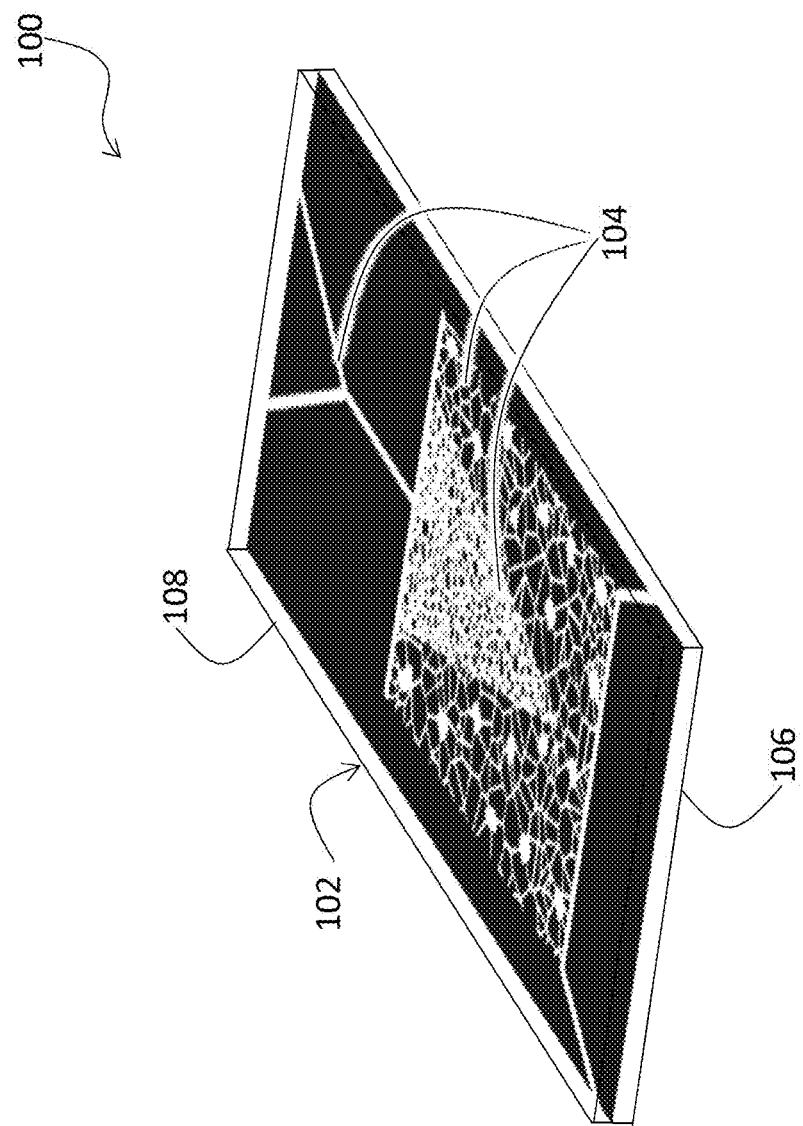
FIG. 1 is a perspective view of an example microfluidic device.

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Generally disclosed herein are microfluidic devices in the form of microfluidic chips, systems incorporating microfluidic devices, and related methods. The microfluidic devices, systems, and methods can be used in the oil and gas industry, in order to model shale and/or tight oil formations, as well as fracture zones (also known as "frac zones") created in such formations during hydraulic fracturing (also known as "fracking"). More specifically, the microfluidic devices can include a nanoporous zone (i.e. a zone that includes channels having a depth on the nanometer scale, or that includes channels that cause fluid therein to behave as nano-confined fluid) that mimics the matrix of a shale and/or tight oil formation, a microporous zone (i.e. a zone that includes channels having a depth on the micron scale, or that includes channels that cause fluid therein to behave as micro-confined fluid) that mimics a fracture zone of a shale and/or tight oil formation, and pores that mimic pores in the matrix of the shale and/or tight oil formation. The inclusion of both a nanoporous zone and a microporous zone on a single device can allow for relatively accurate and realistic modeling of a fracking operation. Furthermore, the microfluidic system can operate in two directions—a forward direction in which fluid is injected into the microfluidic device and flows from the microporous zone to the nanoporous zone, and a reverse direction in which fluid is injected into the microfluidic device and flows from the nanoporous zone to the microporous zone. By operating in both directions, the system can allow for relatively accurate and realistic modelling of oil production in a fracking operation. That is, flow in the forward direction can model the injection of test fluids such as "frac fluids" (e.g. surfactants, friction reducers, gels, dilute acids, and/or corrosion inhibitors) into the shale and/or tight oil formation via the frac zone, and flow in the reverse direction can model the production of oil from the shale and/or tight oil formation via the frac zone. This can be beneficial, for example, to facilitate screening or performance of frac fluids.

Referring now to FIG. 1, an example microfluidic device 100 is shown. The device 100 is in the form of a microfluidic chip, and includes a substrate 102 that has fluid channels 104 (only some of which are labelled in FIG. 1) etched therein and that allows for optical investigation (e.g. imaging, with the use of an optical microscope and/or video recording equipment and/or a photographic camera) of at least some of the fluid channels 104.

In the example shown, the substrate 102 includes a base panel 106 in which the fluid channels 104 are etched, and a cover panel 108 that is secured to the base panel 106 and that covers the fluid channels 104. In the example shown, the base panel 106 is an opaque silicon panel, and the cover panel 108 is a transparent glass panel. In alternative examples, the substrate may be of another configuration. For example, both the base panel 106 and the cover panel 108 can be a transparent glass panel, or the base panel 106 can be a transparent glass panel while the cover panel 108 can be an opaque silicon panel.

Figure 2:
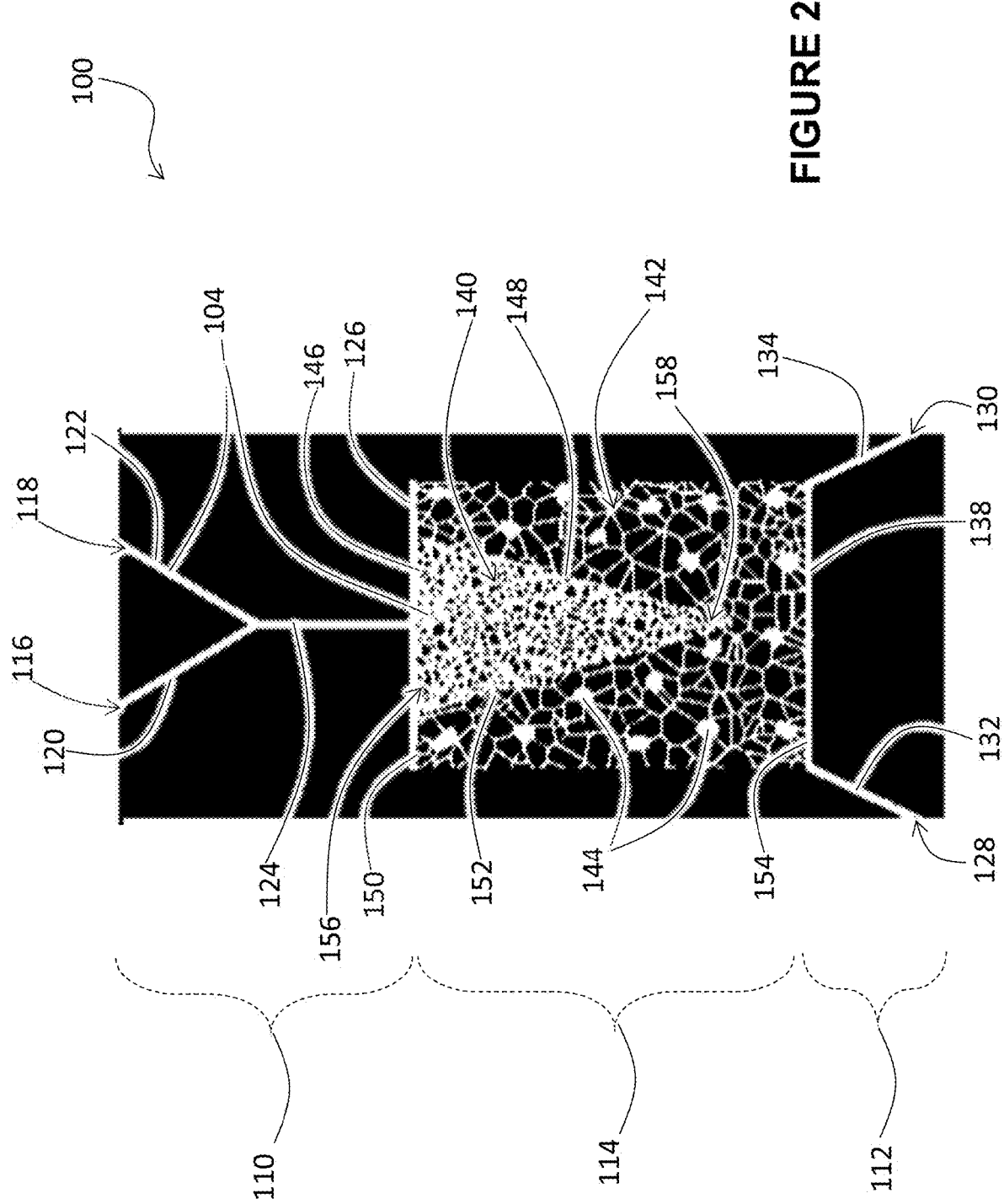
FIG. 2 is a top view of the microfluidic device of FIG. 1.

Referring now to FIG. 2, in the example shown, the fluid channels 104 (again, only some of which are labelled) of the microfluidic device 100 are made up of a first fluid inlet/outlet system 110, a second fluid inlet/outlet system 112, and a fluidic network 114 between the first fluid inlet/outlet system 110 and the second fluid inlet/outlet system 112.

In the example shown, the first fluid inlet/outlet system 110 includes a first 116 and a second 118 inlet/outlet port, into which fluid may be injected or out of which fluid may be ejected, and a set of channels. The channels are microfluidic channels—i.e. the channels have a depth that is in the micron scale, for example between about 1 micron and about 500 microns, or between about 20 microns and about 150 microns. The set of microfluidic channels includes a first 120 and a second 122 inlet/outlet line, each of which is connected to one of the inlet/outlet ports 116, 118, respectively; a third inlet/outlet line 124 that is connected to the first 120 and second 122 inlet/outlet lines; and a fluid distribution channel 126, which distributes fluid to and/or collects fluid from the fluidic network 114.

Similarly, in the example shown, the second fluid inlet/outlet system 112 includes a first 128 and a second 130 inlet/outlet port, into which fluid may be injected or out of which fluid may be ejected, and a set of microfluidic channels. The set of microfluidic channels includes a first 132 and a second 134 inlet/outlet line, each of which is connected to one of the inlet/outlet ports 128, 130, respectively; and a fluid distribution channel 138 that is connected to the first 132 and second 134 inlet/outlet lines, which distributes fluid to and/or collects fluid from the fluidic network 114.

Referring still to FIG. 2, in the example shown, the fluidic network 114 includes both a microfluidic channel network 140 and a nanofluidic channel network 142, as well as a plurality of pores 144 (only two of which are labelled in FIG. 2) that are in fluid communication with the microfluidic channel network 140 and the nanofluidic channel network 142. The microfluidic channel network 140 has channels that have a depth on the micron scale, for example between about 1 micron and about 500 microns, or between about 20 microns and about 150 microns. The nanofluidic channel network 142 has channels that have a depth on the nanometer scale, for example between about 1 nm and about 999 nm, or between about 50 nm and about 500 nm. As mentioned above, the nanofluidic channel network 142 can mimic a matrix of a shale and/or tight oil formation, and the microfluidic channel network 140 can mimic a fracture zone of a shale and/or tight oil formation.

Referring still to FIG. 2, in the example shown, the microfluidic channel network 140 is in fluid communication with the first fluid inlet/outlet system 110. Furthermore, the microfluidic channel network 140 is spaced from the second fluid inlet outlet system 112. That is the microfluidic channel network 140 is not directly connected to the second fluid inlet/outlet system 112. The nanofluidic channel network 142 is between the microfluidic channel network 140 and the second fluid inlet/outlet system 112, and fluidly connects the microfluidic channel network 140 to the second fluid inlet outlet system 112. In the example shown, the nanofluidic channel network 142 is also fluidly connected to the first fluid inlet/outlet system 110. More specifically, in the example shown, the microfluidic channel network 140 has a first set of microfluidic inlet/outlets 146 (only one of which is labelled in FIG. 2) that are fluidly connected to the fluid distribution channel 126 of the first fluid inlet/outlet system 110, and a second set of microfluidic inlet/outlets 148 (only one of which is labelled in FIG. 2) that are fluidly connected to the nanofluidic channel network 142. The nanofluidic channel network 142 has a first set of nanofluidic inlet/outlets 150 (only one of which is labelled in FIG. 2) that are fluidly connected to the fluid distribution channel 126 of the first fluid inlet/outlet system 110, a second set of nanofluidic inlet/outlets 152 (only one of which is labelled in FIG. 2) that are fluidly connected to the microfluidic channel network 140, and a third set of nanofluidic inlet/outlets 154 (only one of which is labelled in FIG. 2) that are fluidly connected to the fluid distribution channel 138 of the second fluid inlet/outlet system 112.

Accordingly, in the example shown, when operating in the forward direction, fluid flows into the first fluid inlet/outlet system 110; from the first fluid inlet/outlet system 110 into the microfluidic channel network 140 and then into the nanofluidic channel network 142, and also from the first fluid inlet/outlet system 110 into the nanofluidic channel network 142 directly; and finally, from the nanofluidic channel network 142 into the second fluid inlet/outlet system 112. This flow pattern can mimic the flow of fluids—e.g. frac fluids and oil—in a fracking operation during frac fluid injection.

Similarly, when operating in the reverse direction, fluid flows into the second fluid inlet/outlet system 112; from the second fluid inlet/outlet system 112 into the nanofluidic channel network 142; from the nanofluidic channel network 142 into the microfluidic channel network 140 and then into the first inlet/outlet system 110, and also from the nanofluidic channel network 142 into first inlet/outlet system 110 directly. This flow pattern can mimic the flow of fluids—e.g. frac fluids and oil—in a fracking operation during production.

In the example shown, the nanofluidic channel network 142 is generally rectangular shaped. In alternative examples, the nanofluidic channel network can be of another shape.

In the example shown, the microfluidic channel network 140 is triangle shaped, and has a base 156 adjacent the first fluid inlet/outlet system 110 and a peak 158 spaced from the first fluid inlet/outlet system 110. In other examples, various other shapes are possible. For example, referring to FIG. 3, an example microfluidic device 300 is shown that includes a nanofluidic channel network 342, a microfluidic channel network 340, and pores 344 (only one of which is labelled). The nanofluidic channel network 342 is rectangular, and the microfluidic channel network 340 is arborescent. The microfluidic channel network 340 has a stem 356 adjacent the first fluid inlet/outlet system 310 and a plurality of branches 358 (only one of which is labelled in FIG. 3) spaced from the first fluid inlet/outlet system 310. The arborescent microfluidic channel network 340 can, in appearance, closely mimic the shape of a frac zone in a shale and/or tight oil formation.

Furthermore, various arrangements of pores are possible. For example, FIG. 4 shows an example microfluidic device 400 having a microfluidic channel network 440 and nanofluidic channel network 442 that are similar to those of FIG. 3; however, the microfluidic device 400 has a density of pores 444 that is greater than the density of pores 344 of FIG. 3.

Furthermore, various configurations of fluid inlet/outlet systems are possible. For example, FIG. 5 shows a microfluidic device 500 that includes a microfluidic channel network 540 and a nanofluidic channel network 542 similar to those of FIG. 2; however, the first fluid inlet/outlet system 510 and a second fluid inlet/outlet system 512 are of a different configuration from those of FIGS. 2 to 4.

Furthermore, the relative area of the first fluid inlet/outlet system, second fluid inlet/outlet system, and fluidic network can vary depending on the magnification under which the microfluidic device is intended to be viewed. For example, the microfluidic device 100 of FIG. 2 may be suitable for viewing under a 1.25× objective lens. An alternative example is shown in FIG. 6, in which the microfluidic device 600 is suitable for viewing under a 5× objective lens.

The microfluidic devices described herein can be manufactured according to various methods, including methods known in the microfluidic industry for etching channels onto substrates. Briefly, the exact configuration of the fluidic network 114 can be determined using various algorithms, which are known in the art and are not described in detail herein. The nanofluidic channel network 142 can then be etched into the silicon base panel 106, followed by etching of the microfluidic channel network 140 and the first 110 and second 112 fluid inlet/outlet systems. Optionally, the inlet/outlet ports 116, 118, 120, 122 can be drilled into the base panel 106 with a laser. The cover panel 108 can then be secured over the base panel, for example by anodic bonding.

Figure 7:
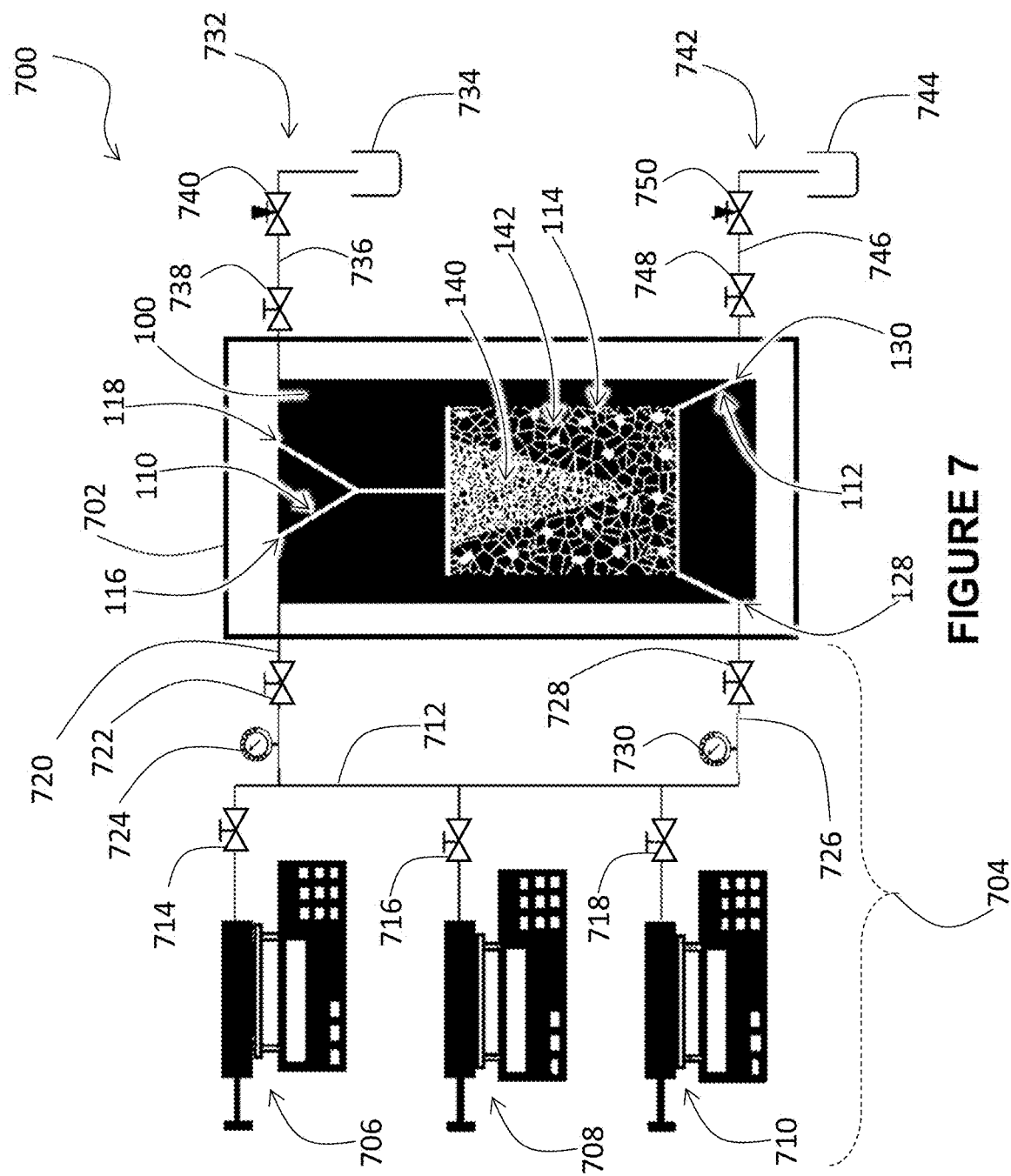
FIG. 7 is a schematic view of an example microfluidic system including the microfluidic device of FIG. 1.

Referring now to FIG. 7, an example microfluidic system 700 is shown. Various microfluidic devices may be mounted in the microfluidic system, including those shown in FIGS. 1 to 6; however, for simplicity, the microfluidic system will be described with reference to the microfluidic device 100 described above.

In the example shown, the system 700 includes a holder 702 for the microfluidic device, which is schematically shown in FIG. 7. The holder 702 can be any suitable holder that allows for fluids to flow into and out of the first fluid inlet/outlet system 110 and second fluid inlet/outlet system 112, and that allows for optical investigation of the fluids as they flow through fluidic network 114. The holder 702 can optionally allow for temperature control of the microfluidic device 100, and can optionally allow for operation of they system 700 under high pressure. An example of such a holder is described in our previous provisional patent application No. 62/721,719 (De Haas et al.), which is incorporated herein by reference in its entirety. Various other holders are known in the art and will not be described in detail herein.

Referring still to FIG. 7, in the example shown, the system 700 further includes a fluid injection system 704, which is connected to the first fluid inlet/outlet system 110 of the microfluidic device 100 via the holder 702, and which can force fluid in a forward direction through the microfluidic device 100 from the first fluid inlet/outlet system 110 to the second fluid inlet outlet 112 system via the fluidic network 114. The fluid injection system 704 is also connected to the second fluid inlet/outlet system 112 of the microfluidic device 100 via the holder 702, and can force fluid in a reverse direction through the microfluidic device 100 from the second fluid inlet/outlet system 112 to first fluid inlet/outlet system 110 via the fluidic network 114.

In the example shown, the fluid injection system 704 includes a first injector 706 for injecting a first fluid, a second injector 708 for injecting a second fluid, and a third injector 710 for injecting a third fluid. The first 706, second 708, and third 710 injectors can be, for example syringe pumps. The first fluid can be, for example, salt water (e.g. brine) or water. The second fluid can be, for example, oil (e.g. an oil sample from the shale/tight oil reservoir that is modelled in the microfluidic device). The third fluid can be, for example, a test fluid (e.g. a frac fluid such as a surfactant). Alternatively, the first, second, and/or third fluids can be various other fluids.

The first 706, second 708, and third 710 injectors are connected to a header line 712 via valves 714, 716, and 718, respectively. The header line 712 is in fluid communication with the first inlet/outlet port 116 of the first fluid inlet/outlet system 110, via line 720, valve 722, and pressure gauge 724, as well as the holder 702. The header line 712 is in fluid communication with the first inlet/outlet port 128 of the second fluid inlet/outlet system 112, via line 726, valve 728, and pressure gauge 730, as well as the holder 702.

In operation, in order to force fluid through the microfluidic device 100 in a forward direction, the first 706, second 708 and/or third injector 710 can be engaged, with its corresponding valve open (i.e. valve 714, 716, and/or 718), and with valve 722 open. In order to force fluid through the microfluidic device 100 in the reverse direction, the first, 706, second 708, and/or third injector 710 can be engaged, with its corresponding valve open (i.e. valve 714, 716, and/or 718), and with valve 728 open.

Referring still to FIG. 7, the system 700 further includes a first fluid collection system 732 connected to the first fluid inlet/outlet system 110 for collecting fluid from the first fluid inlet/outlet system 110 when fluid is forced through the microfluidic device 100 in the reverse direction. The first fluid collection system includes a waste vessel 734 that is connected to the second inlet/outlet port 118 of the first fluid inlet/outlet system 100, via the holder 702, line 736, valve 738 and relief valve 740.

Similarly, referring still to FIG. 7, the system 700 further includes a second fluid collection system 742 connected to the second fluid inlet/outlet system 112 for collecting fluid from the second fluid inlet/outlet system 112 when fluid is forced through the microfluidic device 100 in the forward direction. The second fluid collection system 742 includes a waste vessel 744 that is connected to the second inlet/outlet port 130 of the second fluid inlet/outlet system 112, via the holder 702, line 746, valve 748, and relieve valve 750.

The system 700 can further include an optical investigation system (not shown) for viewing at least a portion of the fluidic network 114, e.g. the microfluidic channel network 140 and/or the nanofluidic channel network 142, during operation. The optical investigation system can include, for example, an imaging system such as a microscope (e.g. an optical microscope), and/or a camera (e.g. a video camera or a photographic camera).

Figure 8:
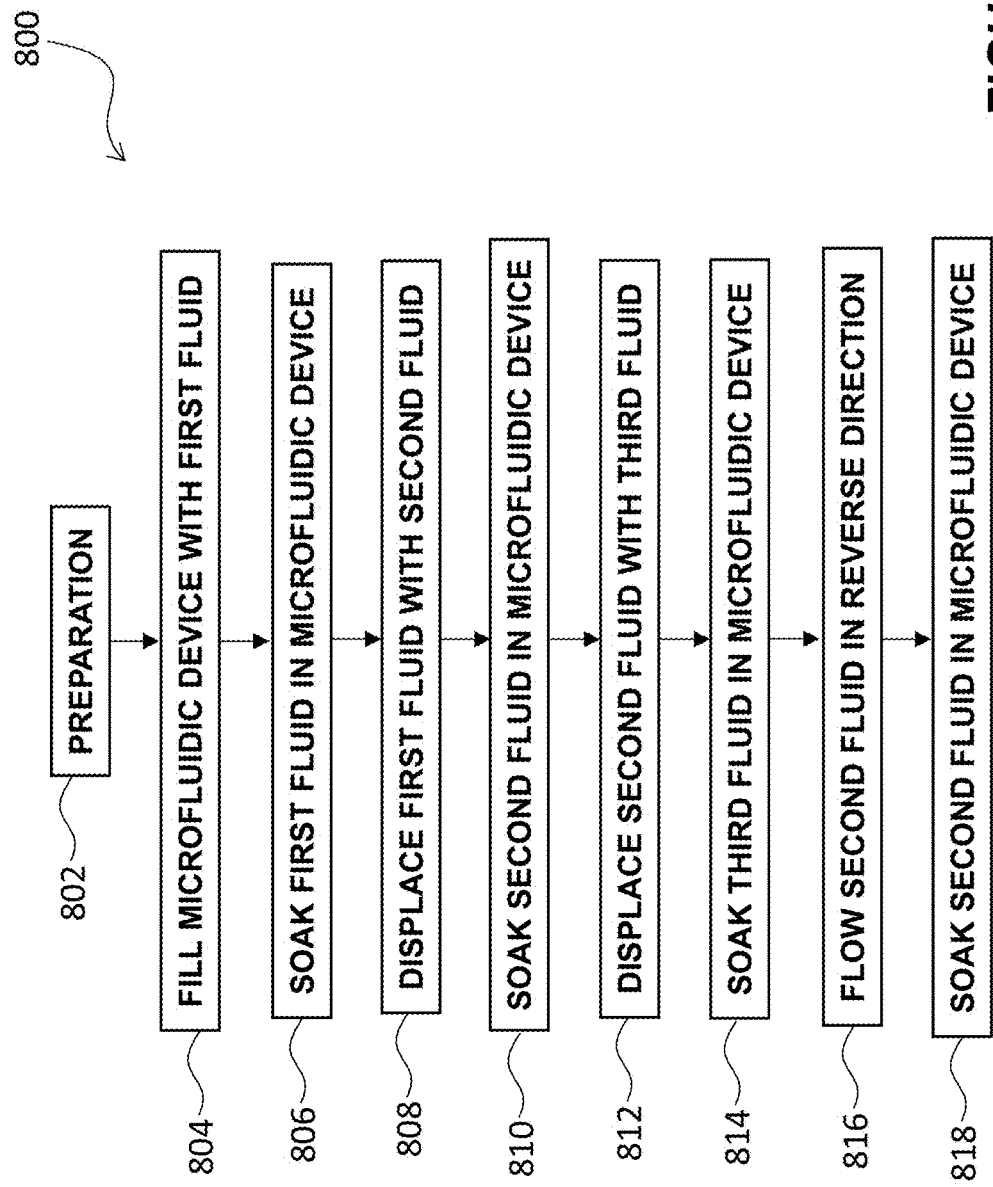
FIG. 8 is a flowchart showing an example method for operating a microfluidic system.

Referring now to FIG. 7 as well as FIG. 8, a method 800 for operating the microfluidic system 700 and microfluidic device 100 will be described. Although the method 800 will be described with reference to the microfluidic system 700 and device 100 described above, the method 800 may be carried out with other systems and devices, and the systems and devices may be operated according to other methods. In the following description, unless a valve is specifically mentioned as being open, it is to be assumed that the valve is closed (e.g. if it is stated that valve 714, valve 728, and valve 738 are open, it can be assumed that valve 716, valve 718, valve 722, and valve 748 are closed, even if not expressly stated).

As a first step 802, various preparation procedures may be carried out, such as pressure testing of the system with nitrogen, and filtration of samples, etc. A vacuum may also be applied to the microfluidic device (e.g. via lines 736 and 746, with valves 738 and 748 open).

As a next step, the microfluidic device 100 may be filled, at step 804. This can be achieved by flowing a least a first volume of fluid through the microfluidic device 100 in a forward direction, from the first fluid inlet/outlet system 110, through the fluidic network 114, and towards the second fluid inlet/outlet system 112. More specifically, valves 714, and 722 may be opened, and the first injector 706 may be engaged, to force water or brine from the first injector 706 into the microfluidic device 100. As described above, the water or brine may flow through the microfluidic device 100 from the first fluid inlet/outlet system 100, through the fluidic network 114 (via the microfluidic channel network 140 and the nanofluidic channel network 142), and towards the second fluid inlet/outlet system 112. The water or brine can be forced into the microfluidic device 100 at a flow rate of, for example, between 10 microliters/min and 500 microliters/min. Optionally, the optical investigation system can be used during this step to visualize and/or record the water or brine flowing through the microfluidic device 100 (e.g. video of the water or brine flowing through the microfluidic device 100 can be recorded, or time-lapse images of the water or brine flowing through the microfluidic device 100 may be captured), or to assess various parameters (e.g. the velocity of the water or brine flowing through the microfluidic device 100, by carrying out an imaging velocity investigation). Alternatively or in addition, the images and/or video can optionally be analyzed to assess various parameters. Optionally, the pressure can be monitored during filling of the microfluidic device 100, to ensure that the maximum pressure rating of the microfluidic device 100 is not exceeded. Once the microfluidic device 100 is full of water or brine, valve 748 may be opened until the water or brine flows out of the microfluidic device 100 into the waste vessel 744. Once the water or brine begins to flow out from valve 744, flow can continue for an additional period of time, for example 10 minutes. All valves can then be closed.

As a next step, the water or brine may be allowed to soak in the fluidic network 114, at step 806, to achieve aging of the fluidic network 114. The soaking step may be carried out for a period of, for example, 10 minutes or more.

As a next step, the first fluid (which in the present example is water or brine) can be displaced with a second fluid (which in the present example is oil), at step 808. This can be achieved by flowing a least a second volume of fluid through the microfluidic device 100 in the forward direction, from the first fluid inlet/outlet system 110, through the fluidic network 114, and towards the second fluid inlet/outlet system 112. More specifically, valves 716, 722 and 748 may be opened, and the second injector 708 may be engaged, to force oil from the second injector 708 into the microfluidic device 100. As described above, the oil may flow through the microfluidic device 100 from the first fluid inlet/outlet system 110, through the fluidic network 114 (via the microfluidic channel network 140 and the nanofluidic channel network 142), and towards the second fluid inlet/outlet system 112. The oil can be forced into the microfluidic device 100 at a flow rate of, for example, between 10 microliters/min and 500 microliters/min. Optionally, the optical investigation system can be used during this step to visualize and/or record the oil flowing through the microfluidic device 100 (e.g. video of the oil flowing through the microfluidic device 100 can be recorded, or time-lapse images of the oil flowing through the microfluidic device 100 may be captured), or to assess various parameters (e.g. the velocity of the oil flowing through the microfluidic device 100 can be assessed, by carrying out an imaging velocity investigation). Alternatively or in addition, the images and/or video can optionally be analyzed to assess various parameters, e.g. to determine the oil saturation in the microfluidic device. Optionally, the pressure can be monitored during step 808, to ensure that the maximum pressure rating of the microfluidic device 100 is not exceeded. Once the oil begins to flow out from valve 748, flow can continue for an additional period of time, for example 10 minutes. All valves can then be closed. Upon completion of step 808, when the microfluidic device 100 is filled with oil, the microfluidic device 100 can model a frac zone and matrix of a shale/tight oil formation.

As a next step, the oil may be allowed to soak in the fluidic network 114, at step 810, to achieve aging of the fluidic network 114. The soaking step 810 may be carried out for a period of, for example, 10 minutes or more.

As a next step, the second fluid (which in the present example is oil) can be displaced with a third fluid (which in the present example is a surfactant), at step 812. This can be achieved by flowing a least a third volume of fluid through the microfluidic device 100 in the forward direction, from the first fluid inlet/outlet system 110, through the fluidic network 114, and towards the second fluid inlet/outlet system 112. More specifically, valves 718, 722 and 748 may be opened, and the third injector 710 may be engaged, to force surfactant from the third injector 710 into the microfluidic device 100. As described above, the surfactant may flow through the microfluidic device 100 from the first fluid inlet/outlet system 110, through the fluidic network 114 (via the microfluidic channel network 140 and the nanofluidic channel network 142), and towards the second fluid inlet/outlet system 112. The surfactant can be forced into the microfluidic device 100 at a flow rate of, for example, between 10 nanoliters/min to 10 microliters/min. The optical investigation system can be used during this step to visualize and/or record the surfactant flowing through the microfluidic device 100 (e.g. video of the surfactant flowing through the microfluidic device 100 can be recorded, and/or time-lapse images of the surfactant flowing through the microfluidic device 100 can be captured), and/or to assess various parameters (e.g. the velocity of the surfactant flowing through the microfluidic device 100 can be assessed by carrying out an imaging velocity investigation). Alternatively or in addition, the images and/or video can optionally be analyzed to assess various parameters. This step—i.e. flowing surfactant through the microfluidic device 100 from a microporous channel network 140 to a nanoporous channel network 142—can model the flow of surfactant into a frac zone of a shale/tight oil formation, and then into the matrix of the shale/tight oil formation, and analysis of the images and/or video can give an indication of the performance of the surfactant. Optionally, the pressure can be monitored during step 812, to ensure that the maximum pressure rating of the microfluidic device 100 is not exceeded. Once the surfactant begins to flow out from valve 748, flow can continue for an additional period of time, for example 10 minutes. All valves can then be closed.

As a next step, the surfactant may be allowed to soak in the fluidic network 114, at step 814, to achieve aging of the fluidic network. The soaking step may be carried out for a period of, for example, 10 minutes or more.

As a next step, at step 816, the flow of fluid can be reversed, by flowing a subsequent volume of fluid (which in this example is a fourth volume of fluid) in a reverse direction from second fluid inlet/outlet system 112, through the fluidic network 114, and towards the first fluid inlet/outlet system 110. In this example, the fourth volume of fluid includes oil (i.e. it is one and the same as the second fluid that was injected at step 808), and forcing the oil through the microfluidic device 100 in the reverse direction, from the nanofluidic channel network 142 to the microfluidic channel network 140, models the flow of oil from a matrix of a shale/tight oil formation through a frac zone of the shale/tight oil formation. That is, step 816 models the production of oil from a shale/tight oil formation. In this step, valves 716, 728 and 738 may be opened, and the second injector 708 may be engaged, to force oil from the second injector 708 into the microfluidic device 100. As described above, the oil may flow through the microfluidic device 100 from the second fluid inlet/outlet system 112, through the fluidic network 114 (via the nanofluidic channel network 142 and the microfluidic channel network 140), and towards the first fluid inlet/outlet system 110. The oil can be forced into the microfluidic device 100 at a flow rate of, for example, between 10 nanoliters/min to 10 microliters/min. The optical investigation system can be used during this step (e.g. video of the oil flowing through the microfluidic device 100 can be recorded, and/or time lapse images of the oil flowing through the microfluidic device 100 can be captured) to visualize the oil flowing through the microfluidic device 100, and/or to assess various parameters (e.g. the velocity of the surfactant flowing through the microfluidic device 100 can be assessed by carrying out an imaging velocity investigation). Visualizing the flow of oil can give a further indication of the performance of the surfactant (e.g. the images can be analyzed to allow for calculation of an oil recovery factor or oil saturation). Optionally, the pressure can be monitored during step 814, to ensure that the maximum pressure rating of the microfluidic device 100 is not exceeded. Once the oil begins to flow out from valve 738, flow can continue for an additional period of time, for example 10 minutes. All valves can then be closed.

As a next step, the oil may be allowed to soak in the fluidic network 114, at step 818, to achieve aging of the fluidic network. The soaking step may be carried out for a period of, for example, 10 minutes or more.

As mentioned above, video recordings and/or still images, particularly those of steps 812 to 818, can be used to determine various parameters, which can be used to give an indication of surfactant performance. For example, the video recordings and/or still images can be used to calculate an oil recovery factor for the surfactant.

Figure 9:
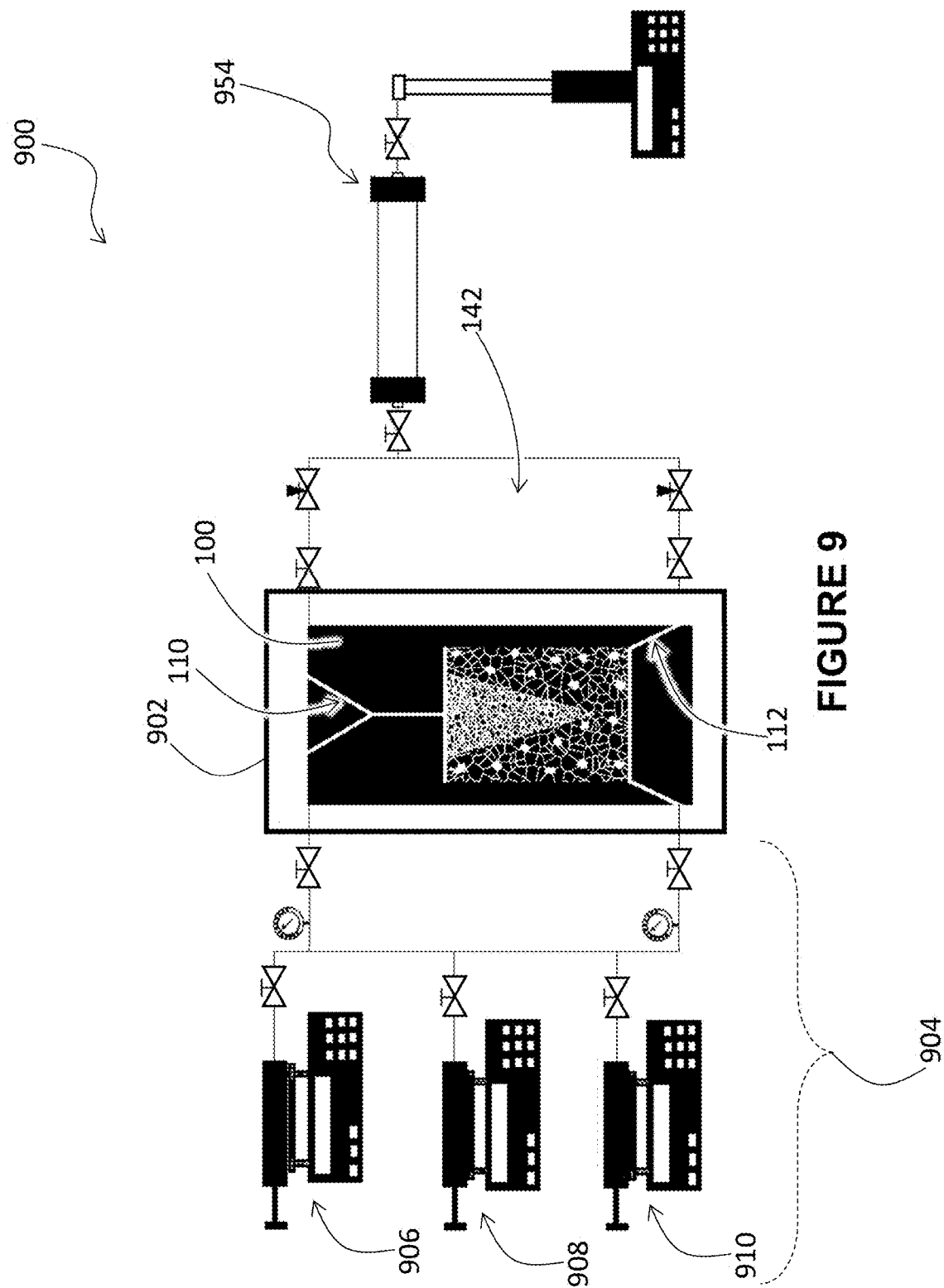
FIG. 9 is a schematic view of another example microfluidic system including the microfluidic device of FIG. 1.

Referring now to FIG. 9, an alternative example of a microfluidic system 900 is shown. In FIG. 9, like features to FIG. 7 will be referred to with like reference numerals, incremented by 200.

The microfluidic system 900 of FIG. 9 is similar to the microfluidic system 700 of FIG. 7, and includes a holder 902, and an injection system 904 with first 906, second 908, and third 910 injectors and corresponding valves and lines, and for simplicity these features are not described again in detail. However, the system 900 is configured for operation under extremely high pressures, for example up to 8000 psi, or between 1400 psi and 3000 psi, and instead of waste vessels, the system includes a back-pressure regulator 954 in fluid communication with first fluid inlet/outlet system 110 and the second fluid inlet/outlet system 112 of the microfluidic device 100.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A method for operating a microfluidic device, comprising:
    a. flowing at least a first volume of fluid into a microfluidic channel network of the microfluidic device, wherein the microfluidic channel network comprises a first plurality of channels that are arranged in a first network and that have a depth of between about 1 micron and about 500 microns;
    b. flowing the first volume of fluid from the microfluidic channel network into a nanofluidic channel network of the microfluidic device, wherein the nanofluidic channel network comprises a second plurality of channels that are arranged in a second network and that have a depth of between about 1 nanometer and about 999 nanometers; and c. conducting an optical investigation of the first volume of fluid as the first volume of fluid flows through the microfluidic channel network and/or the nanofluidic channel network.

2. The method of claim 1, further comprising, after step b.:

d. flowing a second volume of fluid into the microfluidic channel network of the microfluidic device;

e. flowing the second volume of fluid from the microfluidic channel network into the nanofluidic channel network; and f. conducting an optical investigation of the second volume of fluid as the second volume of fluid flows through the microfluidic channel network and/or the nanofluidic channel network.

3. The method of claim 2, further comprising, after step e.:

g. flowing a third volume of fluid into the microfluidic channel network of the microfluidic device;

h. flowing the third volume of fluid from the microfluidic channel network into the nanofluidic channel network; and i. conducting an optical investigation of the third volume of fluid as the third volume of fluid flows through the microfluidic channel network and/or the nanofluidic channel network.

4. The method of claim 3, further comprising, after step h.:

j. reversing the flow of fluid by flowing a fourth volume of fluid into the nanofluidic channel network, and flowing the fourth volume of fluid from the nanofluidic channel network into the microfluidic channel network; and k. conducting an optical investigation of the fourth volume of fluid as the fourth volume of fluid flows through the nanofluidic channel network and/or the microfluidic channel network.

5. The method of claim 4, wherein the first volume of fluid comprises salt water, the second volume of fluid comprises oil, the third volume of fluid comprises a test fluid, and the fourth volume of fluid comprises oil.

6. The method of claim 1, further comprising, after step b.:

d. reversing the flow of fluid by flowing a subsequent fluid into the nanofluidic channel network and from the nanofluidic channel network back into the microfluidic channel network; and e. conducting an optical investigation of the subsequent fluid as the subsequent fluid flows through the nanofluidic channel network and/or the microfluidic channel network.

7. The method of claim 1, wherein step c. comprises conducting an imaging velocity investigation of the first volume of fluid.

8. A method for operating a microfluidic device, comprising:

a. modelling fluid injection into an oil formation by flowing at least a first volume of fluid through a microfluidic device in a forward direction from a first fluid inlet/outlet system, through a fluidic network that mimics the oil formation, and towards a second fluid inlet/outlet system;

b. modelling oil production from the oil formation by reversing the flow of fluid by flowing a subsequent volume of fluid in a reverse direction from the second fluid inlet/outlet system, through the fluidic network, and towards the first fluid inlet/outlet system; and c. conducting an optical investigation of at least a portion of the fluidic network during step a. and/or step b.

9. The method of claim 8, further comprising, between steps a. and b.:

i. flowing a second volume of fluid through the microfluidic device in the forward direction; and ii. conducting an optical investigation of at least a portion of the fluidic network during step i.

10. The method of claim 9, further comprising, after step i.:

iii. flowing a third volume of fluid through the microfluidic device in the forward direction; and iv. conducting an optical investigation of at least a portion of the fluidic network during step iii.

11. The method of claim 10, wherein the first volume of fluid comprises salt water, the second volume of fluid comprises oil, and the third volume of fluid comprises a test fluid.

12. The method of claim 8, wherein step a. comprises: flowing the first volume of fluid into a microfluidic channel network of the fluidic network, and then flowing the first volume of fluid from the microfluidic channel network into a nanofluidic channel network of the fluidic network.

13. The method of claim 12, wherein step b. comprises flowing the subsequent fluid from the nanofluidic channel network back into the microfluidic channel network.

* * * * *